3,301,122
FASTENER WITH DEFORMABLE
LOCKING COLLAR
Kenneth L. Wagner, Torrance, Calif., assignor to Hi-Shear Corporation, Torrance, Calif., a corporation of California
Filed Mar. 17, 1965, Ser. No. 440,430
2 Claims. (Cl. 85—7)

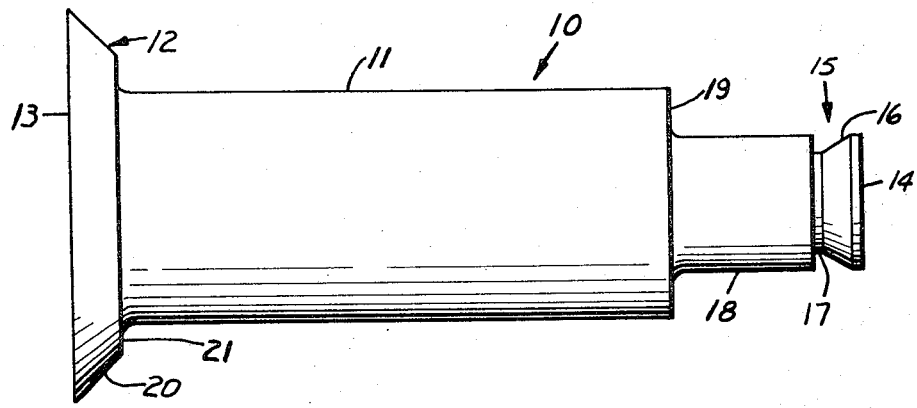
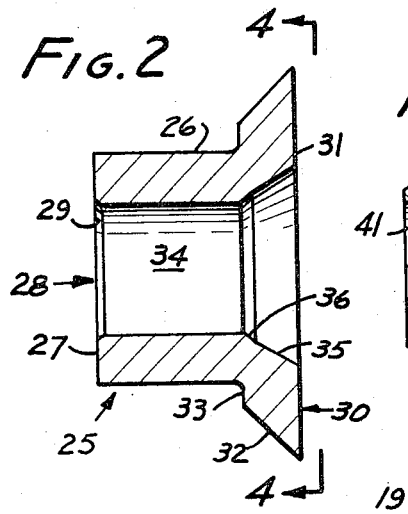
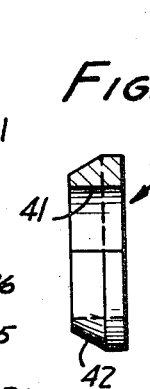
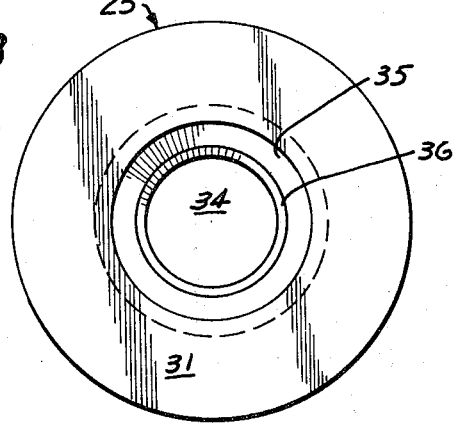
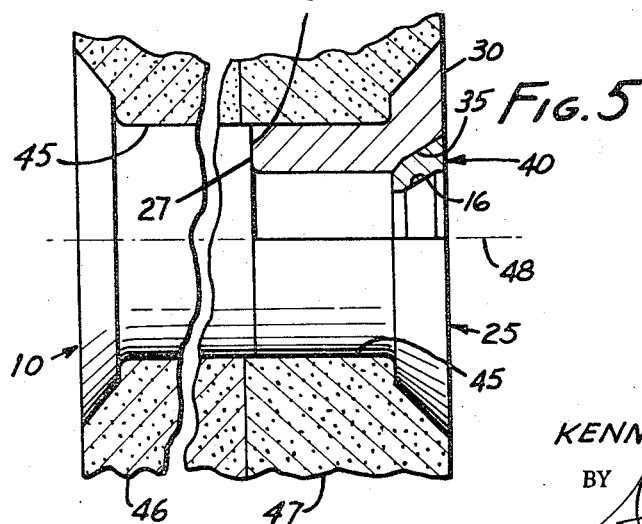

This invention relates to a fastener which is especially suited for installation in crushable material.

In crushable material such as honeycomb, nut-bolt, and rivet-type fasteners are not suitable for the reason that it is possible to tighten down the fastener to such an extent as to crush part of the structure which is being joined. What is needed is a device which can reliably be installed and whose axial length is accurately predeterminable. Such an objective is met by the instant invention.

A fastener according to this invention comprises a pin with an axial shank that has a head at a first end and a groove at the second end thereof. A restraint shoulder at least partially bounds the groove near the second end, and there is a shank segment adjacent to the groove on the opposite side thereof from that second end. A stop shoulder is provided adjacent to the segment which also faces toward the second end. A sleeve has a tubular shank that is adapted to fit over the segment. It has a stop face which is adapted to abut the restraint shoulder so as accurately to determine the relative axial positions of the sleeve and the pin. A head is formed adjacent to the second end of the sleeve, and it and the head of the first end of the shank engage opposite sides of the material in which the fastener is set. There is an axial passage through the sleeve and a deflector face is disposed in this passage which tapers outwardly toward the second end of the sleeve. A tubular collar is adapted to pass over the second end of the pin shank, then to be pressed against the deflector face and by it to be deflected against the restraint shoulder. This deformed tubular collar then forms a lock between the restraint shoulder and the deflector face which prevents the separation of the pin and the sleeve.

According to a preferred but optional feature of the invention, the segment passage, restraint shoulder, deflector face, and collar all are formed as surfaces of revolution.

According to still another preferred but optional feature of the invention, the collar includes a tapered guide surface at its end which faces the deflector face, thereby more readily to be deflected into the thread groove.

The above and other features of this invention will be fully understood from the following detailed description and the accompanying drawings in which:

FIG. 1 is a side elevation of a pin forming part of the invention;

FIG. 2 is an axial cross-section of a sleeve forming a part of the invention;

FIG. 3 is a side elevation of a collar also forming part of the invention;

FIG. 4 is a right-hand end view of FIG. 2 taken at line 4—4 thereof; and

FIG. 5 is a fragmentary elevation partly in cutaway cross-section showing a portion of the assembled fastener comprising those parts illustrated in FIGS. 1–3, inclusive.

FIG. 1 illustrates a pin 10 which forms a portion of the invention. The pin includes a cylindrical shank 11 having a head 12 at a first end 13 thereof. Near the second end 14 thereof there is a groove 15, one side of which is at least partially defined by a peripheral restraint shoulder 16 which is frusto-conical in nature. The groove has a flat bottom 17. Adjacent to the groove and on the opposite side thereof from the second end of the pin, there is a peripheral cylindrical segment 18 bound at its left-hand end by a stop shoulder 19. The remainder of the shank has a larger diameter than that of segment 18.

The head is a countersink type having a frusto-conical surface 20 adjacent to a step 21.

FIG. 2 illustrates a sleeve 25 which includes a tubular shank 26. A flat annular stop face 27 is formed at a first end 28 of the tubular shank. There is a small chamfer 29 at this end. At the second end 30 of the sleeve there is formed a head 31 of the countersink type having a frusto-conical surface 32 and a step 33 similar to the respective elements on head 12. An axial passage 34 passes through the head and the tubular shank. It includes a deflector face 35 which tapers outwardly as it extends toward the second end, and is frusto-conical in nature. If desired, a second deflector face 36 is formed immediately contiguous thereto to give a sharper deflection to a collar yet to be described. The passage is continuous through the tubular shank and the head.

In FIG. 3 there is shown a collar 40 which is generally circular in nature. It has a hole 41 therethrough, and a tapered guide surface 42 near the left-hand end thereof that is adapted to contact the deflector face 35 in the sleeve. The conical angles of the deflector face and the guide surface are usually equal, although occasionally it will be desired for the included conical angle of the guide surface 42 to be smaller than that of the deflector face by about 5°. A convenient included conical angle for these two surfaces is about 60°.

The fastener according to the invention comprises pin 10, sleeve 25, and collar 40 assembled as shown in FIG. 5 in preformed holes 45 in workpieces 46 and 47, which are to be joined by the fastener. It will be understood that this device may be utilized as a tubular means for attachment, if desired, by drilling a hole through the pin.

It will be seen that, when the sleeve is placed over the pin, stop shoulder 19 and stop face 27 abut each other so that the relative axial position along axis 48 (which is the concentric axis of all of the elements) is determined. The heads 12 and 31 seat in countersinks in the workpieces and the collar is swaged by pressing it into the region between the restraint shoulder and the deflector face. The swaging compresses the collar inwardly where it stands to form a lock preventing the separation of the pin and the collar as shown in FIG. 5.

It will be understood that flat heads, filister heads and other classes of heads could be used instead of the illustrated countersunk head.

There is provided by this invention a fastener which can be installed in a hole, even in crushable materials so as to join bodies together without damaging the material in which it is set. Of course it can be used on non-crushable, relatively harder, and more rigid materials as well. The device is readily set by simple hammering or pressing operation. The principal parts (the pin and sleeve) may be formed of very hard and strong material, if desired, while the material of the collar may be selected for ready swageability. For example, the pin and sleeve may readily be made of 305 stainless steel, while the collar may be made of R "Monel" metal in an annealed condition.

This invention is not to be limited by the embodiment shown in the drawings or described in the description which is given by way of example and not of limitation but only in accordance with the scope of the appended claims.

I claim:

1. A fastener having an axis, and comprising: a pin having an axial shank having a first diameter, a head adjacent to a first end of the shank, a groove adjacent to the second end of the shank, a tapered peripheral restraint shoulder at least partly bounding the side of said groove which is closer to the second end, a cylindrical segment on the shank adjacent to the groove on the opposite side thereof from the second end and having a dimension of length and a second diameter which is smaller than said first diameter, a stop shoulder adjacent to the segment and facing toward the second end; a sleeve having a tubular shank with an outer and an inner diameter, the said outer diameter being equal to said first diameter and said inner diameter being substantially equal to said second diameter, a stop face at a first end, and a head adjacent to the second end thereof, a deflector face in said passage tapering outwardly as it extends toward the second end of the sleeve, the stop face being adapted to abut the stop shoulder on the pin when the segment is in the passage, the said length being such that the restraint shoulder and the deflector face are at least partially axially aligned but spaced apart from each other; and a deformable tubular collar adapted to pass over the second end of the pin shank, to be pressed against the deflector face, and thence to be deflected against the restraint shoulder, whereby to form a lock between the restraint shoulder and the deflector face which prevents separation of the pin and the sleeve, the axial spacing-apart of the heads and the ultimate length of the assembled fastener being determined by the abutment of the stop face and the stop shoulder.

2. A fastener according to claim 1 in which the collar includes a guide surface at its end which faces the deflector face, the guide surface tapered so as to narrow toward said end.

References Cited by the Examiner
UNITED STATES PATENTS

| | | | |
|---|---|---|---|
| 2,016,826 | 10/1935 | Arnold | 85—5 |
| 2,887,003 | 5/1959 | Brilmyer | 85—72 |
| 3,038,626 | 6/1962 | Simmons | 85—78 |

CARL W. TOMLIN, *Primary Examiner.*

R. S. BRITTS, *Assistant Examiner.*